United States Patent
Falk

(10) Patent No.: US 10,353,830 B2
(45) Date of Patent: Jul. 16, 2019

(54) METHOD AND MEMORY MODULE FOR SECURITY-PROTECTED WRITE PROCESSES AND/OR READ PROCESSES ON THE MEMORY MODULE

(71) Applicant: SIEMENS AKTIENGESELLSCHAFT, München (DE)

(72) Inventor: Rainer Falk, Poing (DE)

(73) Assignee: SIEMENS AKTIENGESELLSCHAFT (DE)

( * ) Notice: Subject to any disclaimer, the term of this patent is extended or adjusted under 35 U.S.C. 154(b) by 212 days.

(21) Appl. No.: 15/225,868

(22) Filed: Aug. 2, 2016

(65) Prior Publication Data

US 2017/0060779 A1 Mar. 2, 2017

(30) Foreign Application Priority Data

Aug. 24, 2015 (DE) ........................ 10 2015 216 082

(51) Int. Cl.
*H04L 9/32* (2006.01)
*G06F 12/14* (2006.01)
(Continued)

(52) U.S. Cl.
CPC ...... *G06F 12/1408* (2013.01); *G06F 12/1416* (2013.01); *G06F 21/64* (2013.01);
(Continued)

(58) Field of Classification Search
CPC .. G06F 12/14; G06F 12/1408; G06F 12/1416; G06F 12/1425; G06F 12/1433;
(Continued)

(56) References Cited

U.S. PATENT DOCUMENTS

2004/0059925 A1* 3/2004 Benhammou ....... G06F 12/1458
713/189
2005/0050342 A1 3/2005 Boivie et al.
(Continued)

FOREIGN PATENT DOCUMENTS

CN 1581110 A 2/2005
CN 1985229 A 6/2007
(Continued)

OTHER PUBLICATIONS

Wikipedia: "Speichervirtualisierung"; Virtuelle Speicherverwaltung. Wikipedia, Die freie Enzyklopädie; Bearbeitungsstand: Oct. 7, 2014; URL: https://de.wikipedia.org/w/index.php?title=Speichervirtualisierung&oldid=13467 5498 [abgerufen am May 17, 2016] / Oct. 7, 2014.
(Continued)

*Primary Examiner* — Shanto Abedin
*Assistant Examiner* — Adrian Stoica
(74) *Attorney, Agent, or Firm* — Schmeiser, Olsen & Watts, LLP

(57) ABSTRACT

A method for security-protected write processes and/or read processes on a memory module is provided. The method includes the steps of transmitting user data to the memory module, stipulating a piece of security information in a first memory area of the memory module, and automatically concomitantly updating at least one predefined portion of the security information upon a write access operation for the user data on the memory module and/or upon a prescribed trigger, wherein the memory module determines the concomitantly updated security information automatically.

25 Claims, 5 Drawing Sheets

(51) Int. Cl.
*G06F 21/64* (2013.01)
*G06F 21/78* (2013.01)
*H04L 29/06* (2006.01)

(52) U.S. Cl.
CPC ............ *G06F 21/78* (2013.01); *H04L 9/3271* (2013.01); *H04L 63/083* (2013.01); *H04L 63/0876* (2013.01); *H04L 63/123* (2013.01); *G06F 2212/1052* (2013.01)

(58) Field of Classification Search
CPC .... G06F 12/1441; G06F 12/145; G06F 21/60; G06F 21/62; G06F 21/6218; G06F 21/64; G06F 21/70; G06F 21/78; G06F 21/79; G06F 12/08; G06F 12/0802; G06F 12/0806; G06F 12/0866; G06F 12/0868; G06F 12/10; G06F 12/1009; G06F 12/1027; H04L 63/08; H04L 63/083; H04L 63/0876; H04L 9/32; H04L 9/3226; H04L 9/3271; H04L 63/10; H04L 63/102; H04L 63/12; H04L 63/123; H04L 9/3247; H04L 9/3297

See application file for complete search history.

(56) References Cited

U.S. PATENT DOCUMENTS

| | | |
|---|---|---|
| 2005/0283777 A1 | 12/2005 | Osen |
| 2010/0318746 A1 | 12/2010 | Troxel et al. |
| 2014/0136806 A1 | 5/2014 | Rudelic |
| 2014/0137271 A1 | 5/2014 | Hyde et al. |
| 2014/0173294 A1* | 6/2014 | Buer ................ G06F 12/1408 713/193 |
| 2014/0281554 A1* | 9/2014 | Maletsky ................ H04L 9/14 713/175 |
| 2015/0012974 A1* | 1/2015 | Unitt ...................... H04L 63/08 726/4 |
| 2015/0235020 A1* | 8/2015 | Nagai ..................... G06F 21/44 726/28 |
| 2016/0188909 A1* | 6/2016 | Zatko ..................... G06F 21/71 726/26 |

FOREIGN PATENT DOCUMENTS

| | | |
|---|---|---|
| CN | 102307193 A | 1/2012 |
| WO | WO 0133317 A1 | 5/2001 |

OTHER PUBLICATIONS

Non-English Chinese Office Action for application No. 201610712131.1 dated Jan. 2, 2019.

\* cited by examiner

METHOD AND MEMORY MODULE FOR SECURITY-PROTECTED WRITE PROCESSES AND/OR READ PROCESSES ON THE MEMORY MODULE

CROSS-REFERENCE TO RELATED APPLICATIONS

This application claims priority to German Application No. DE 102015216082.3 having a filing date of Aug. 24, 2015 the entire contents of which are hereby incorporated by reference.

FIELD OF TECHNOLOGY

The following relates to a method and a memory module for security-protected write processes and/or read processes on the memory module.

BACKGROUND

Memory chips are used for persistent storage of data in order to store not only program data, such as firmware or an operating system, for example, but also configuration data or user data on a device. The device may be a field device or a controller, for example. In practice, this frequently involves the use of separate memory modules, for example for storing the firmware and the configuration data.

Such memory modules may be permanently installed in a device or interchangeable. An example of a permanently installed memory module is a soldered serial EEPROM. Interchangeable memory modules are what is known as a C plug, an ID plug, an SD card (secure digital memory card) or a USB stick, for example. These memory modules are frequently partially or completely overwritten during the period of use of a device, for example in order to change configuration data of a field device. In order to protect security-relevant data, in particular security-relevant configuration data, on the field device, for example, memory modules are frequently used that permit access to the memory modules only if the user has authenticated himself beforehand. These security-protected memory chips particularly have the advantage that production thereof is much more complex and more expensive and that use is awkward.

SUMMARY

An aspect relates to providing a method and a memory module having easily implementable security functions for providing a piece of security information from the memory content.

According to a first aspect, embodiments of the invention relates to a method for security-protected write processes and/or read processes on a memory module, wherein the following method steps are performed:

In a first method step, user data are transmitted to the memory module.

In a second method step, security information is stipulated in a first memory area of the memory module.

In a third method step, at least one predefined portion of the security information is automatically concomitantly updated upon a write access operation for the user data on the memory module and/or upon a prescribed trigger.

In this case, the first memory area and also the second and third memory areas cited below are located in a shared, or are each located in a separate, protected address space or memory chip of the memory module, for example. The memory chip or address space preferably has features that take account of the security requirements of the respective memory area. These features are a once-only writeable memory, a memory that is accessible only inside the memory module or a read-only memory (ROM), for example.

"Device" is preferably intended to be understood to mean a device, for example a field device, having a main processor, which device uses a memory module. Application is preferably intended to be understood to mean an application program that is installed on the device and communicates with the memory module, or communicates via an interface of the device or of the memory module.

The automatic concomitant update of the security information or of the at least one predefined portion of the security information in a first memory area means that it is clearly comprehensible that a write access operation has taken place. In particular, it is not necessary for the whole memory content to be subjected to cryptographic integrity protection, that is to say to have its integrity protected, since in each case it is comprehensible, on the basis of the concomitantly updated security information, that a write access operation has taken place. A device that uses the memory module is capable of requesting this security information, for example, in order to establish whether an unauthorized write access operation has taken place. As a result, it is firstly possible to achieve easily implementable integrity protection, and it is secondly possible to achieve a particularly high level of protection for the user data, preferably configuration data or security-relevant data.

The memory module does not have to determine information on the basis of the written data, for example a cryptographic checksum for the memory content. In the case of such a checksum method, implementation may be very complex, depending on the application scenario. Furthermore, it would be less flexible than the proposed solution, in which the security information is used to stipulate a checkable piece of information, also called check information. This security information in the form of the check value, for example, can be requested by an external application or by the device that uses the memory module. The significance of the security information, which may also be a checksum or a simple counter, for example, is not prescribed by the memory module. This achieves a high level of flexibility for the method, since the requesting party, preferably the application or the device, can interpret the security information itself.

In a first embodiment, the stored security information is overwritten during the concomitant update.

In principle, it is possible for a memory module to keep a history of the security information in a memory or memory area of the memory module. In order to keep the memory requirement for the security information as low as possible, however, the security information is overwritten during the concomitant update, preferably each time. Alternatively, it is conceivable for a predefined number of pieces of security information, for example, to be stored as a history. By way of example, the memory module can keep the last five values of the security information. As a result, a device or user is able to retrieve the security information from previous write processes from longer ago.

In further embodiments of the method, in addition to the user data, a piece of tag information is transmitted, wherein the tag information comprises particularly memory addresses and/or file names, wherein the security information comprises particularly the tag information.

As a result, the user or the device can additionally establish which data have potentially been altered during an unauthorized write access operation. This allows particularly system administrators to use the security information to accurately analyze the manipulations performed in the event of a failed check.

In further embodiments of the method, the concomitant update of the security information is effected on the basis of the transmitted tag information.

If the memory module stores security-critical and security-uncritical information, then it is not necessary to update the security information upon a write process for security-uncritical data, for example. This particularly has the advantage that the memory module can be used for security-critical and security-uncritical applications and a device only needs to have one memory module, since this covers both application scenarios.

In further embodiments of the method, the security information and/or the user data is/are provided by the memory module.

Provision of the security information allows a user or a device that uses the memory module to request the security information and to process it itself.

In further embodiments of the method, the following method steps are additionally performed: a further method step is performed for the purpose of checking the automatically concomitantly updated portion of the security information by means of a checking algorithm on the basis of a predefined check criterion. The checking algorithm may particularly be a cryptographic algorithm, for example the checking of a cryptographic checksum, i.e. of a message authentication code or of a digital signature. Additionally, in a further method step, a signal is provided if the checking algorithm has established a critical deviation from the predefined check criterion.

A memory module can additionally be equipped with the ability to check the security information itself. If a critical deviation from the predefined check criterion is established, then the signal that encodes a piece of control information, for example, can be used to notify a system administrator. Alternatively, the device can be put into a security-protected mode, for example, so that further manipulations by unauthorized third parties are not possible.

In further embodiments of the method, the security information comprises a piece of identification information for the memory module.

The identification information renders the memory module used easy for a system administrator, for example, to identify if said memory module has reported a manipulation, for example via a wireless communication interface, to the administrator.

In further embodiments of the method, the signal puts a device in which the memory module is installed into a security mode.

This prevents further manipulations from being performed on the device when a manipulation is identified. Particularly for security-critical installations, it is important to react to an identified manipulation immediately in automated form.

In further embodiments of the method, the signal is transmitted to a central memory monitor via an interface.

This allows the security-protected memory modules of an installation, for example a power plant, to be monitored and evaluated centrally.

In further embodiments of the method, the prescribed trigger is any write access to the memory module and/or completion of a write process on the memory module and/or activation of a write mode for the memory module, wherein the write mode is preferably initiated by means of a password input.

The effect achieved by this is that the security information is concomitantly updateable in the most flexible manner possible.

In further embodiments of the method, the portion of the security information that is to be concomitantly updated comprises a write cycle count value that is implemented particularly as an incremental counter.

A write cycle count value can be implemented very easily. Additionally, the update of a count value is resource-saving, which means that no expensive computation components need to be installed in the memory module.

The implementation as an incremental counter can be realized particularly easily, since this does not require any expensive additional system components to be installed for the memory module.

In further embodiments of the method, the portion of the security information that is to be concomitantly updated comprises a random value that is preferably produced by a memory-module-internal random number generator.

The random value increases the security of the method still further, since this random value can be used in a challenge/response protocol between the requesting party, for example a user or a device, and the memory module, for example. This allows particularly what are known as replayer attacks and rollback attacks to be prevented.

In further embodiments of the method, the portion of the security information that is to be concomitantly updated comprises a piece of time-of-day information that is preferably provided by a memory-module-internal realtime clock.

The time-of-day information allows the last write access operation to be established in a simple manner. In particular, it makes it possible to establish when an unauthorized third party has written data to the memory module, for example.

In further embodiments of the method, a first checksum for checking the user data is provided by the memory module.

The first checksum does not just make it possible to establish whether an unauthorized third party has written data to the memory module. Additionally, it is possible to establish whether the data themselves have been manipulated.

In further embodiments of the method, a second memory area contains a cryptographic key, wherein the second memory area is writable, preferably a single time.

The cryptographic key can be used to perform authentication of the memory module and/or of a user or of a device in a simple manner, for example. To this end, the user or the device likewise needs to have the cryptographic key or a second cryptographic key associated with the cryptographic key or to perform certificate-based authentication by means of a symmetric or asymmetric cryptographic key pair. In such an application scenario, the device produces a first digital signature for data that are intended to be written to the memory module, for example. The memory module preferably uses the cryptographic key, for example a public key, in order to authenticate the digital signature or the digital certificate. In order to achieve a highest possible level of security for the method, the second memory area can have the cryptographic key written to it preferably only a single time. The second memory area may therefore be a read-only memory, for example.

In further embodiments of the method, an authentication of the memory module and/or of the user data is performed by means of the cryptographic key. Additionally, the authentication preferably involves the use of a challenge/response protocol, in which a second checksum is computed by means of the cryptographic key for a portion of the user data or for all of the user data. The authentication preferably involves a response to the challenge from the challenge/response protocol comprising the challenge itself and/or the cryptographic key and/or a portion of the security information or the complete security information or a response value computed on the basis thereof. As a result, it is possible to ascertain the present value of the concomitantly updated security information of the memory module in a manner protected against manipulation.

These features achieve a much higher level of integrity protection for the user data on the memory module. This makes it possible to establish not only illegal write access operations on the memory module but also, fundamentally, manipulations on transmitted data that can potentially arise during a data transmission.

In further embodiments of the method, an integrity value for all data or for a portion of the data, particularly of the user data, of the memory module is stored in a third memory area of the memory module, wherein the integrity value is produced, particularly in automated fashion, by the memory module even upon storage of the user data on the memory module, wherein the integrity value is provided particularly by the memory module.

This allows the provision of an integrity value for the security-relevant data of the memory module. A user or a device, for example a field device, is able to check the data integrity in a simple manner by retrieving this integrity value from the memory module. This is useful in work environments, for example, in which there is potentially a high probability of data on the memory module being able to be damaged or unintentionally altered.

In further embodiments of the method, a change to the integrity value prompts the concomitant update to be performed. Additionally, an integrity of the data is checked preferably upon reading by virtue of a further integrity value for all of the data or for a portion of the data being formed. Additionally, the integrity is confirmed if preferably the integrity value and the further integrity value match sufficiently.

As a result, the memory module is able to check the integrity of the user data itself. If the device establishes that the integrity of the user data no longer exists or that the integrity is invalid, then it can put functions for data backup or data restoration or the device into an inherently secure state, for example.

In further embodiments of the method, the response additionally comprises the integrity value.

This allows particularly the security of the challenge/response protocol to be significantly increased, since the integrity of the user data is likewise contained in the response.

In further embodiments of the method, the first checksum and/or the second checksum is/are formed using the integrity value.

This has particularly the advantage that the integrity value is formed in a very fast manner. This is particularly important if the memory module is intended to be used for high-performance applications, since the formation of an integrity value for all of the user data would be too complex.

In further embodiments of the method, the first memory area and/or the second memory area and/or the third memory area are located wholly or in part in a protected memory area, wherein a third party effects only read access to the protected memory area.

A memory module preferably comprises multiple memory chips that are addressable via various memory areas. In this respect, there is the possibility of the first memory area being a separate memory chip in the memory module. Since these memory areas or these single memory chips have read-only access effected on them from outside the memory module, they are protected against alterations or unauthorized alterations by third parties.

According to a further aspect, embodiments of the invention relate to a memory module that comprises a user data memory for storing user data, a first memory area and at least one control device. The control device stipulates a piece of security information in the first memory area of the memory module. The control device automatically concomitantly updates at least one predefined portion of the security information upon a write access operation for the user data on the memory module and/or upon a prescribed trigger, wherein the memory module determines the concomitantly updated security information automatically.

In a first embodiment, the memory module additionally has a checking device for checking the automatically updated portion of the security information on the basis of a predefined check criterion. Additionally, the memory module comprises a provision device for providing a signal if the result of the checking is a sufficient deviation from the predefined check result.

In a further embodiment of the memory module, the memory module additionally comprises a random number generator and/or a realtime clock.

In further embodiments of the memory module, the memory module is an EEPROM.

According to a further aspect, embodiments of the invention relate to a computer system, for example a field device, that has a memory module according to the features described above.

According to a further aspect, embodiments of the invention relate to a virtualized memory module in accordance with the features specified above.

Furthermore, a computer program product having program commands for performing the cited method according to embodiments of the invention is claimed. Additionally, a provision apparatus for storing and/or providing a data structure that comprises the computer program product is claimed. By way of example, the provision apparatus is a data storage medium that stores and/or provides the computer program product. Alternatively, the provision apparatus is a computer system, a server system, a network, a cloud-based computer system and/or virtual computer system, for example, that stores and/or provides the computer program product. This provision is preferably effected as a download for the complete computer program product, but can also be effected as a partial download, for example, that consists of multiple portions and is downloaded particularly via a peer-to-peer network. Such a computer program product is read into a system using the provision apparatus in the form of a data storage medium, for example, and executes the program commands, so that the method according to embodiments of the invention is executed on the computer.

BRIEF DESCRIPTION

Some of the embodiments will be described in detail, with reference to the following figures, wherein like designations denote like members, wherein.

DETAILED DESCRIPTION

In the figures, elements having the same function are provided with the same reference symbols, unless stated otherwise.

Figure 1:
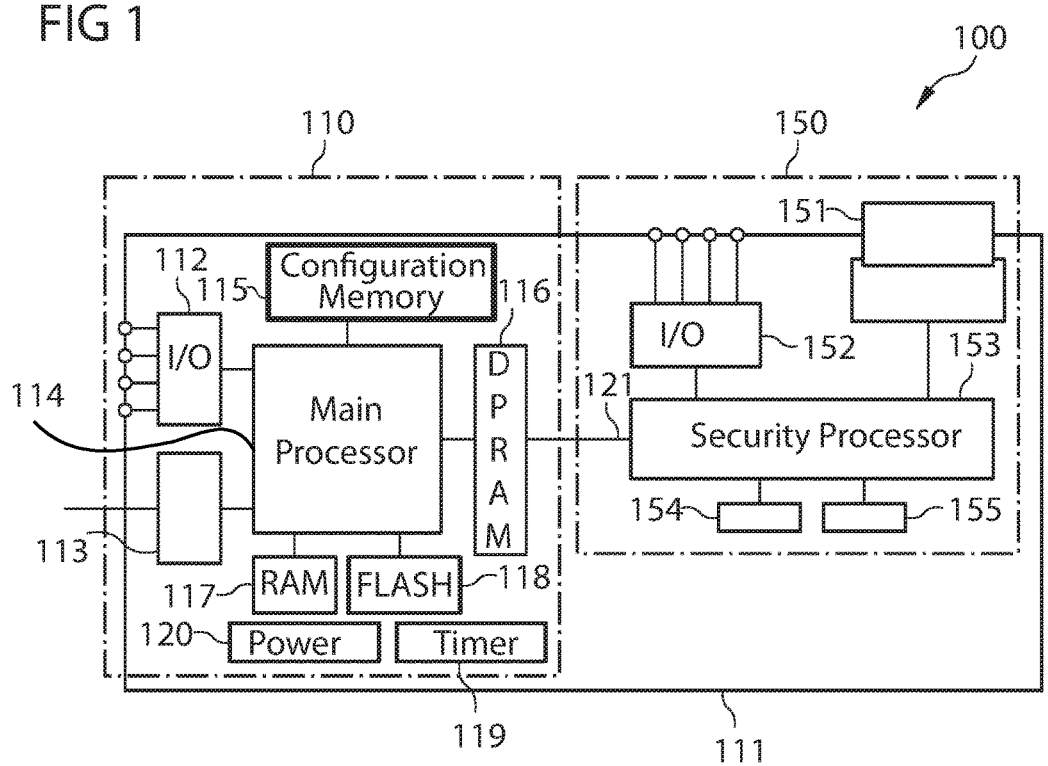
FIG. 1 shows a schematic illustration of a field device based on the prior art.

FIG. 1 shows a schematic illustration of a field device 100, as is known from the prior art. The field device is first of all split into a nonsecure area, which is called subsystem 110, and into a secure subsystem, which is called security subsystem 150. The subsystem 110 is connected to the security subsystem 150 by means of a communication bus 111. Furthermore, the subsystem 110 of the field device 100 has a first input/output interface 112, a network interface 113, a main processor 114, a configuration memory 115, for example in the form of an EPROM memory, a dualport main memory (DPRAM) 116, a first main memory 117, a first flash memory 118, a timer 119 and a power supply 120. The security subsystem 150 comprises a security configuration memory module 151, a second input/output interface 152, a security processor 153, a second main memory 154 and a second flash memory 155.

The main processor 114 uses an internal interface to access the configuration memory 115. By way of example, this is a serial EEPROM. Furthermore, the main processor 114 uses a volatile memory (RAM) as first main memory 117 and also the first flash memory 118 for loading an operating system, a control program or other program commands, for example. By way of example, the subsystem 110 of the field device 100 has the task of using the network interface 113 to communicate with a network, for example a TCP/IP (Transmission Control Protocol/Internet Protocol) network, that can also perform monitoring and diagnosis functions. Via the dualport main memory 116, the main processor 114 communicates with the security processor 153 of the security subsystem 150 by means of a security bus 121. FIG. 1 shows this communication on a single-channel basis (a main processor), but there may also be multiple redundant channels provided. The second input/output interface or security interface 152 can be used to connect security-critical sensors or actuators, for example. These may be a points drive sensor or an axle counter sensor, for example.

Furthermore, the security subsystem 115 comprises a security interface into which the security configuration memory module 151 can be inserted. The security configuration memory module 151 contains project planning data, for example. On the basis of the security configuration of the field device 100, the security processor 153 performs security-relevant control operations.

To this end, the security processor 153 can produce or edit security protocol messages from a security protocol. The communication with another field device or a central computer is then effected via the dualport main memory 116 and the main processor 114 of the subsystem 110, for example. This involves data packets being sent and received via the network interface 113, for example.

The field device described in FIG. 1 has three memories in principle. These are the configuration memory (EEPROM), the flash memory and the security configuration memory module. In principle, each of these memories, subsets of these memories or all memories may be a memory module, as described in FIGS. 2 to 4.

Figure 2:
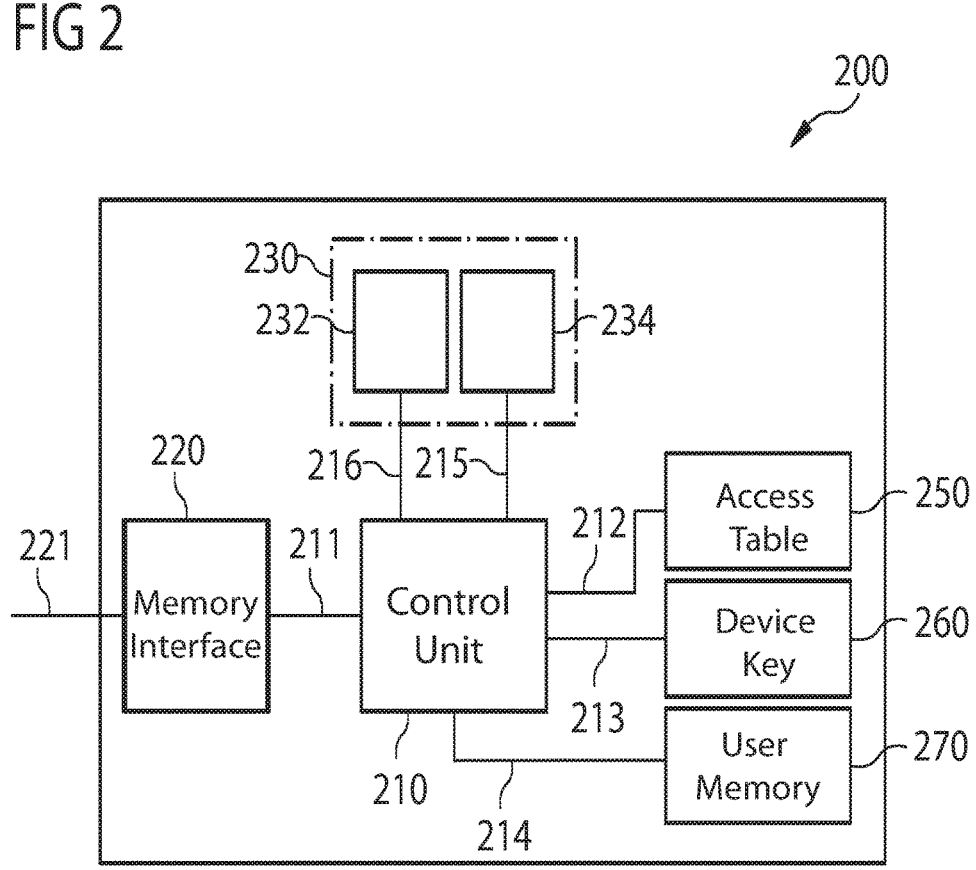
FIG. 2 shows a schematic illustration of a first exemplary embodiment of a memory module.

FIG. 2 shows a schematic illustration of a first exemplary embodiment of a memory module 200 for security-protected write processes and/or read processes.

The memory module 200 comprises a control unit 210, having a processor, an internal bus, a memory interface 220, a second bus 221, a piece of security information in a first memory area 230, a piece of identification information 232, a piece of write cycle identification information 234, an access table 250, a device key 260 and a user data memory 270 that stores data persistently. The memory control unit 210 is connected to the first memory area 230, the access table 250, the device key 260 and the user memory 270 via an internal bus, which may be split into a first subbus 211, a second subbus 212, a third subbus 213, a fourth subbus 214, a fifth subbus 215 and a sixth subbus 216, for example. The identity information 232, which is an identifier for the memory module 100, for example, and the write cycle identification information 234 are portions of a piece of security information that are stored in the first memory area 230 of the memory module 100 and are preferably each connected to the memory control unit 210 via a subbus of their own, the fifth subbus 215 and the sixth subbus 216.

The memory interface 220 and the bus 221 are used to communicate with a processor, for example a main processor of a device or field device. The memory interface 220 or the bus 221 can be used to transmit commands, such as read commands, write commands, a command for reading an identifier, a check command or an input command for a password, for example, to the memory module 200.

The memory module 200 then responds to these commands, for example with a confirmation of the request, or sends data to the requesting party. In this case, the memory control unit 210 accesses the actual user data memory 270, which can be used to store configuration data, for example. Using the device key 260, it is possible for a user, for example, the main processor of the device, to be authenticated by the memory module 200. The access table 250 can be used to prescribe the conditions under which memory areas of the user data memory 270 are readable and writeable, for example.

A write access operation prompts the write cycle identification information 234 to be updated. This can be effected upon every write access operation, upon activation of a write access option by means of a command, for example by a password input, upon completion of a write process, following expiry of a prescribed time interval, by a reset command, for example for a particular memory address, or completion of a write access option that is performed by a command, such as a command for password input preferably with an empty password parameter. It is likewise possible for every write access operation (that is to say a write command) to prompt an update to be effected.

The write cycle identification information 234 can be implemented in various ways. By way of example, it is possible for a counter to be incremented.

In another variant, the write cycle identification information 234 is set with a random value. In this case, the memory module 200 additionally has a random number generator.

Alternatively, the memory module 200 comprises an internal realtime clock, so that the write cycle identification information 234 can be determined on the basis of the current time of day.

The text below explains the basic flow of a communication between a processor of a field device and the memory module 200.

First of all, a processor, for example the main processor of the field device, sends a read command for a particular memory address to the memory module 200. Provided that the memory address is in an uncritical or unprotected area, the memory module returns the data and a confirmation report to the processor. In a further step, the processor requests the security information 230, that is to say the identification information and the write cycle identification information 234, from the memory module 200 with a command. The processor checks this information and, provided that it is correct, transmits a password to the memory module 200 in order to activate the write mode of the memory module 200. If the memory module 200 has confirmed the correctness of the password, then the processor of the field device sends a write command with data and the desired memory address, to which the data are intended to be written, to the memory module 200. The memory module 200 updates the write cycle identification information 234 automatically during writing of the data. Following successful completion of writing of the data and update of the write cycle identification information 234, this is confirmed to the processor. The processor can then in turn request the security information from the memory module 200. The memory module provides the updated security information, that is to say the updated write cycle identification information 234, for the processor. The processor, or the field device, can check the security information in order to establish whether the data have been written correctly.

Figure 3:
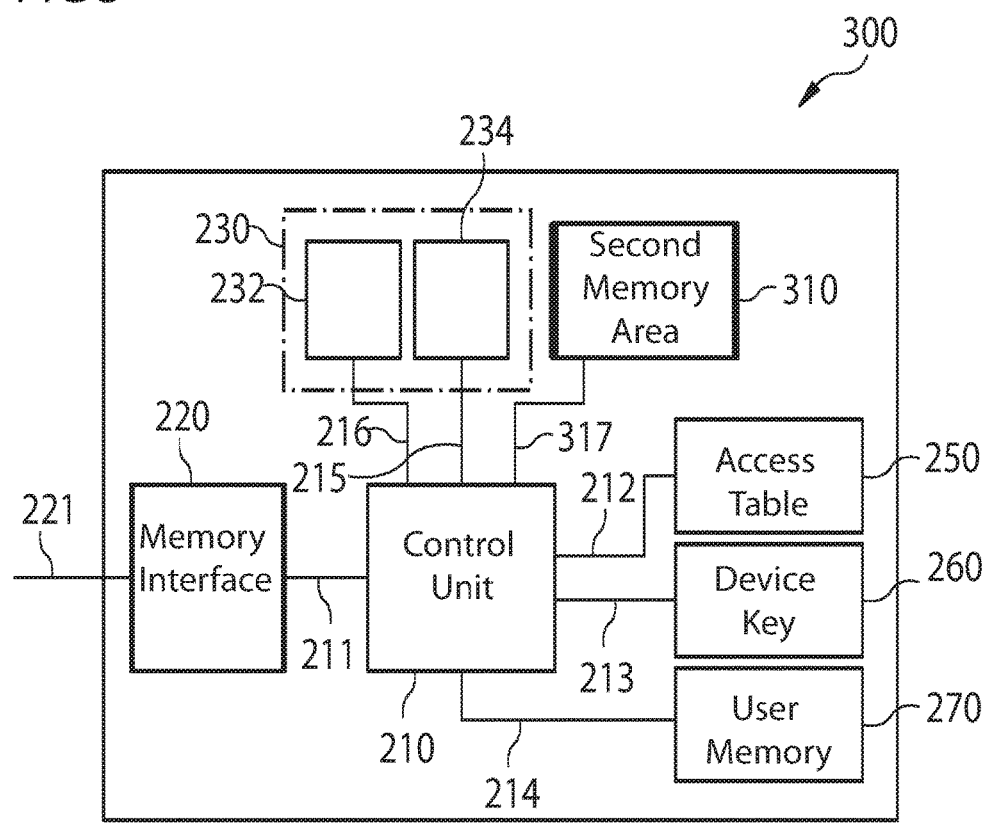
FIG. 3 shows a schematic illustration of a second exemplary embodiment of a memory module.

FIG. 3 shows a schematic illustration of a second exemplary embodiment of a memory module 300. In this exemplary embodiment, the memory module, which has been explained in the description relating to FIG. 2, is extended by a second memory area 310 for a cryptographic key memory. The second memory area 310 is connected to the memory control unit 210 via a seventh subbus 317, for example.

Specifically, the memory module 300 has, by means of the second memory area 310, a cryptographic key that is stored in the latter. This is preferably implemented as a memory that is writeable a single time, for example an OTP (one time programmable) memory. This can be used to effect authentication of the memory module 300. To this end, a device (or user) that uses the memory module 300 sends an authentication command, for example, which uses the challenge/response protocol. To this end, the memory control unit 210 preferably computes a cryptographic checksum, for example a message authentication code, using the cryptographic key.

Computation of the message authentication code can involve the use of methods such as HMAC-SHA256 (Keyed-Hash Message Authentication Code-Secure Hash Algorithm), AES-CBCMAC (Advanced Encryption Standard-Cipher Block Chaining Message Authentication Code), or a digital signature EC-DSA (Elliptic Curve Digital Signature Algorithm). The cryptographic checksum can be computed either only for a particular memory area of the memory module 300, for all user data or for the requested user data.

For an authentication, the memory module 300 receives a challenge from the requesting party by means of the challenge/response protocol. The memory control unit 210 then produces a response, which, as parameters, preferably takes account of the challenge and/or the cryptographic checksum and/or the identification information 232 and/or the write cycle identification information 234. The ascertained response is then provided by the memory module 300, so that it is checkable by the field device, the system or the application.

Figure 4:
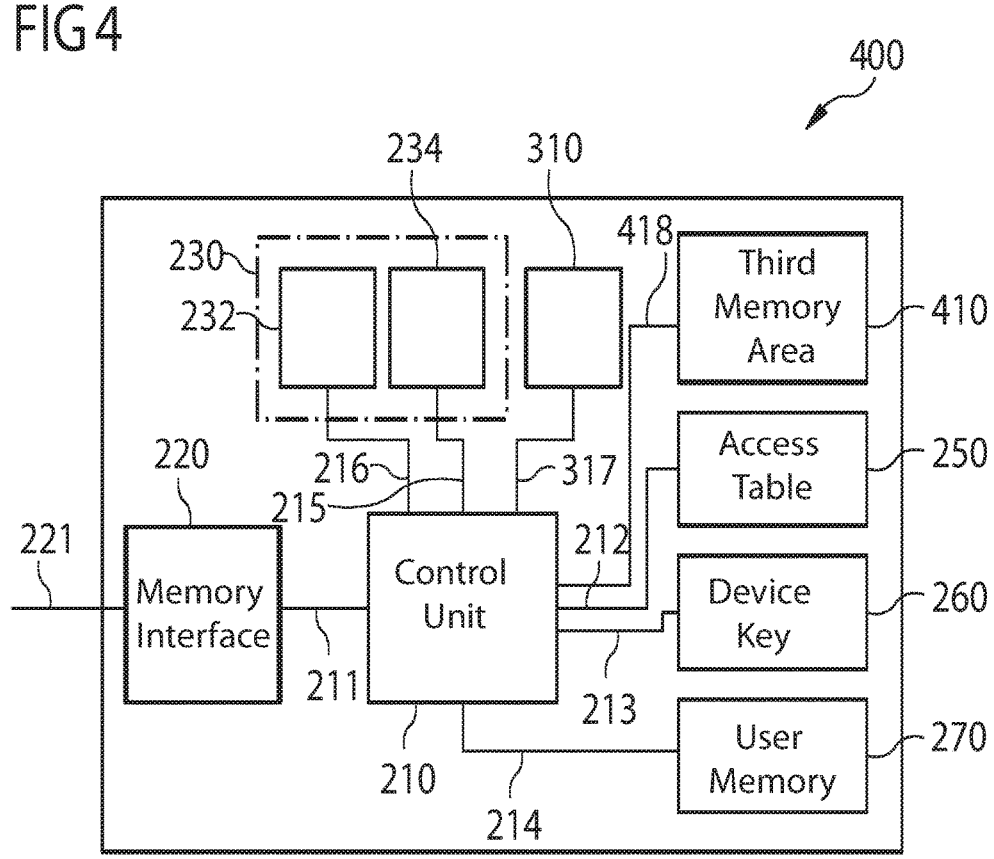
FIG. 4 shows a schematic illustration of a third exemplary embodiment of a memory module.

FIG. 4 shows a schematic illustration of a third exemplary embodiment of a memory module 400. In this exemplary embodiment, the memory module, which has been explained by the description relating to FIG. 3, is extended by a third memory area 410 for an integrity checksum memory. The third memory area 410 is connected to the memory control unit 210 via an eighth subbus 418, for example.

This third memory area 410 is provided for the purpose of storing an integrity value preferably in the form of an integrity checksum. Specifically, the write cycle identification information 234 is updated only upon being written to this third memory area 410.

Preferably, a system, user or a processor of a device can write an integrity value for data of the memory module, for example user data preferably in the form of a configuration file, from security information or from configuration data, to the third memory area 410. By way of example, the integrity value can be formed using the SHA256 (Secure Hash Algorithm) algorithm. Upon being written to this third memory area 410, the write cycle identification information 234 is updated in order to render the alterations to the integrity value checkable.

When data are read from the memory module 400, for example by the processor of a device, the processor ascertains the integrity value of the read data and compares it with the value in the third memory area 410. These need to match in order for the read data to be identified as valid.

Furthermore, the processor of the device, for example, authenticates the memory module 400 with an authentication command and a challenge from the challenge/response protocol. The memory module 400 computes a response that, as a parameter, comprises the integrity value that is stored in the third memory area 410. Additionally, the response may likewise comprise the challenge and/or the cryptographic checksum and/or the identification information 232 and/or the write cycle identification information 234.

In other words, the response for authentication of the memory module 400 takes account of the information that has been explained in the description relating to FIG. 3. Additionally, the response also takes account of the integrity value, however.

This exemplary embodiment of the memory module 400 has the advantage that an authenticated, unmanipulated integrity value for the memory content is storable. In this case, only cryptographic computations to a small extent need to be performed. The memory module 400 needs to implement the cryptographic checksum only for a fixed, small volume of data and therefore does not have to ascertain the integrity value for the actual memory content itself. This can be performed by the processor of the device that uses the memory module 400, for example. To this end, the processor uses the third memory area 410 of the memory module 400, which third memory area is protected by the memory module 400, in order to store the integrity value.

Use of the write cycle identification information 234 means that a piece of security information, which can be regarded as up-to-datedness information, is available if the memory content of the third memory area 410 has been written. In particular, a changed piece of write cycle identification information 234 can be taken as a basis for identifying whether a write process has been effected.

In an application scenario in which the memory module 400 is used as security configuration memory, it is therefore possible to take a changed piece of write cycle identification information 234 as a basis for identifying that a write process has taken place. This can be checked by a security processor of a security subsystem, for example. If a write process has taken place, then it is possible, regardless of whether or how the memory content has been changed, for a write process to be followed by the need for fresh security clearance for the device that uses the memory module 400 by a user.

In one variant, the write cycle identification information 234 of the third memory area can also be used for storing a device identifier, for example for a controller or field device. To this end, an identifier that is selectable by a user, for example a user-selectable character string, is written to the third memory area 410. Said identifier is augmented by a piece of write cycle identification information 234 chosen at random by the memory module 400 in order to form a piece of authenticatable identification information. Said authenticatable identification information consists, in a manner protected by a hardware mechanism, of a portion that is selectable by a user and a nonprescribable portion. As a result, a user cannot recreate an identical device identifier from another device, even though the identifier is otherwise user-selectable.

In a further variant, a read access operation and/or a write access operation on the third memory area is/are protected by security functions, for example a password input or an authentication using a cryptographic key.

Figure 5:
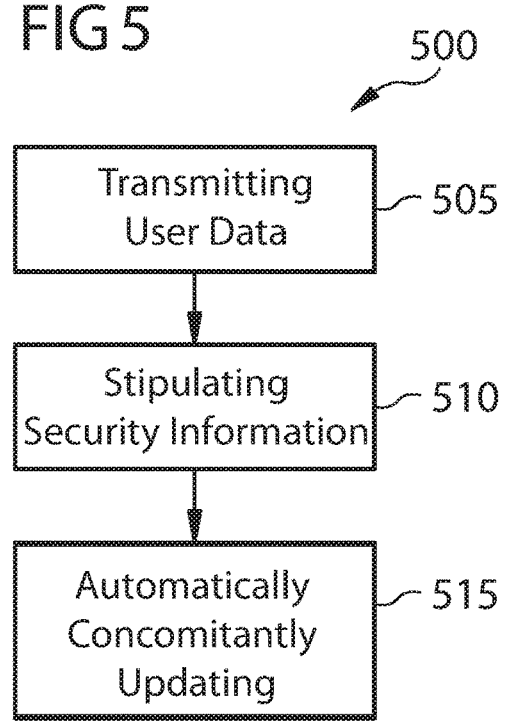
FIG. 5 shows a flowchart for an exemplary embodiment of the method for security-protected read and/or write processes on a memory module.

FIG. 5 shows a flowchart for an exemplary embodiment of the method for security-protected read and/or write processes on a memory module.

It is proposed that a piece of security information of a memory module be concomitantly updated upon a write process. The security information preferably consists of a fixed invariable portion, for example a piece of identification information of the memory module, and/or of a variable portion, for example a piece of write cycle identification information that is automatically updated upon a write process on the content of the memory module or a user data memory of the memory module.

In this case, update of the security information upon a write process can be controlled on the basis of different triggers. In the simplest case, all write processes that relate to the entire memory content prompt the security information to be updated, for example. Preferably, however, the update is triggered only when writing takes place on a specific subarea, also called a protected memory area, of the total available memory area of the memory module.

In one variant, this protected memory area can be configured. Such a configuration of a memory area protected in this manner may either be configurable a single time, for example upon first use of the memory module, or this protected memory area can be configured in a specific mode of operation. By way of example, this mode of operation can be configured by means of a user name and password input, a specific software or hardware switch of the memory module, for example a jumper, or by means of a piece of configuration information that has been safeguarded with a digital signature, the key for checking the signature being stored in the second memory area, for example.

Additionally, a third memory area may be provided as integrity checksum memory. This memory area has an integrity value written to it, for example a checksum value from transmitted user data, particularly from a configuration parameter, or from data on the memory module.

In this case, the security information, for example the write cycle identification information, particularly in the form of a write cycle count value, of the memory is updated. The write cycle identification information and the update thereof can be implemented in various ways. By way of example, a counter value can be incremented or chosen at random. It is also possible, additionally or taken in isolation, for a checksum to be formed for the old write cycle identification information or for the old write cycle identification information and the new write cycle identification information.

It is then possible to check the integrity value. To this end, the memory module determines a cryptographic checksum, for example a message authentication code, that takes account of the current value of a write cycle count value. This write cycle count value may be a simple counter, for example, that is incremented upon every write access operation.

In one variant, a distinction is drawn between various write access operations, for example overwriting with a write command, erasure of the memory or a command for tamper erasure. In this case, an update can be effected only for particular types of write access in one variant.

In another variant, the write cycle identification information is structured into multiple portions. In this case, a particular write access operation can prompt a particular portion of the write cycle identification information to be updated.

By checking the write cycle identification information, it is possible to identify whether a write access operation was effected. Checking of the cryptographic checksum also allows a write access operation that has been effected to be subsequently checked for manipulation.

The write cycle identification information can be checked by a device itself that uses the memory module. In the event of a deviation from a check criterion, e.g. overwriting of a security configuration, the device can disable itself, so that it first needs to be enabled again by an administrator.

It is furthermore possible for the write cycle identification information to be transmitted from the device to a central monitoring system, for example as a portion of diagnosis data or log data. As a result, there is central identifiability of when the memory content of a memory module has been written. This is identifiable even if the original memory content has been restored following manipulation of an installation, for example, since the security information, particularly the write cycle identification information and the identification information, of the memory module can be changed only by the memory module itself and not by third parties, for example an application program, user or device, externally.

In other words, embodiments of the invention relate to a method for security-protected write processes and/or read processes on a memory module.

In this method, a first method step 505 involves user data, for example configuration data, being transmitted from a device that uses the memory module to the memory module.

A second method step 510 involves security information being stipulated in a first memory area of the memory module. This stipulation can occur during production of the memory module, for example, or can be configured by an administrator when the memory module is first used.

A third method step 515 involves at least one predefined portion of the security information being automatically concomitantly updated upon a write access operation for user data on the memory module and/or upon a prescribed trigger, wherein the memory module automatically determines the concomitantly updated security information.

Figure 6:
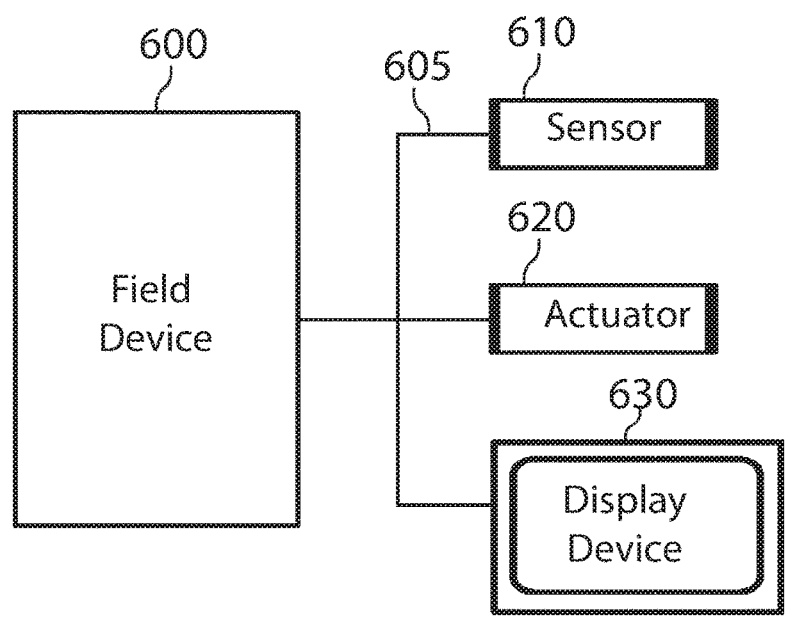
FIG. 6 shows a schematic illustration of a field device with a memory module.

FIG. 6 shows a schematic illustration of a field device 600 with a memory module.

The field device has a memory module according to one of the cited exemplary embodiments. Additionally, the field device 600 comprises a sensor 610, an actuator 620, for example in the form of a points drive, and a display device 630, these elements of the field device 600 being communicatively connected to one another via a databus 605.

Although the invention has been illustrated and described in more detail by the exemplary embodiments, the invention is not restricted by the disclosed examples, and other variations can be derived therefrom by a person skilled in the art without departing from the scope of protection of the invention.

The invention claimed is:

1. A method for security-protected write processes and/or read processes, comprising:
    providing a memory module having a control unit with a processor, a first memory area connected to the control unit by a first memory area subbus, a second memory area connected to the control unit by a second memory area subbus, and a third memory area connected to the control unit by a third memory area subbus;
    transmitting user data to the memory module, the user data being stored on a user memory of the memory module connected to the control unit by an internal subbus;
    stipulating security information that is stored in the first memory area of the memory module; and
    performing an automatic concomitant update of at least one predefined portion of the stipulated security information in the first memory area upon a write access operation for the user data on the memory module;
    wherein the memory module automatically determines the portion of the stipulated security information to be automatically concomitantly updated,
    wherein the second memory area contains a cryptographic key that performs authentication of at least one of the memory module, a user, and the user data, wherein the second memory area is writable for a single time,
    wherein an integrity value for all data or for a portion of the user data of the memory module is stored in the third memory area of the memory module,
    wherein the integrity value is produced in automated fashion by the memory module upon storage of the user data on the memory module, and
    wherein the integrity value is provided by the memory module.

2. The method as claimed in claim 1, wherein the stored security information is overwritten during the automatic concomitant update.

3. The method as claimed in claim 1, wherein in addition to the user data, a piece of tag information is transmitted, the tag information including memory addresses and/or file names, and the security information comprises the tag information.

4. The method as claimed in claim 3, wherein the automatic concomitant update of the security information is effected on a basis of the transmitted tag information.

5. The method as claimed in claim 1, wherein the security information and/or the user data is/are provided by the memory module.

6. The method as claimed in claim 1, further comprising: checking the automatically concomitantly updated portion of the security information by means of a checking algorithm on a basis of a predefined check criterion; and providing a signal if the checking algorithm stipulates a deviation from the predefined check criterion.

7. The method as claimed in claim 1, wherein the security information comprises a piece of identification information for the memory module.

8. The method as claimed in claim 6, wherein the signal puts a device in which the memory module is installed into a security mode.

9. The method as claimed in claim 6, wherein the signal is transmitted to a central memory monitor via an interface.

10. The method as claimed in claim 1, wherein the performance of the automatic concomitant update of at least one predefined portion of the stipulated security information in the first memory area occurs upon completion of a write process on the memory module and/or is activation of a write mode for the memory module, wherein the write mode is initiated by means of a password input.

11. The method as claimed in claim 1, wherein the portion of the security information that is to be concomitantly updated comprises a piece of write cycle identification information that is implemented particularly as an incremental counter.

12. The method as claimed in claim 1, wherein the portion of the security information that is to be concomitantly updated comprises a random value that is produced by a memory-module-internal random number generator.

13. The method as claimed in claim 1, wherein the portion of the security information that is to be concomitantly updated comprises a piece of time-of-day information that is provided by a memory-module-internal real-time clock.

14. The method as claimed in claim 1, wherein a first checksum for checking the user data is provided by the memory module.

15. The method of claim 1, wherein the method is implemented by a computer readable program code having program commands, wherein the computer readable program code having program commands is stored on a computer program product comprising a non-transitory computer readable hardware storage device.

16. The method as claimed in claim 1, wherein an authentication of the memory module and/or of the user data is performed by means of the cryptographic key, the authentication involves the use of a challenge/response protocol, in which a checksum is computed by means of the cryptographic key for a portion of the user data or for all of the user data, and the authentication involves a response to a challenge from the challenge/response protocol comprising the challenge and/or the cryptographic key and/or a portion of the security information or the complete security information.

17. The method as claimed in claim 1, wherein a change to the integrity value prompts the automatic concomitant update to be performed, an integrity of the data is checked upon reading by virtue of a further integrity value for all of the data or for the portion of the data being formed, and the integrity is confirmed if the integrity value and the further integrity value match.

18. The method as claimed in claim 16, wherein the checksum is formed only using the integrity value.

19. The method as claimed in claim 1, wherein the first memory area and/or the second memory area and/or the third memory area are located wholly or in part in a protected memory area, and wherein a third party effects only read access to the protected memory area.

20. A memory module, comprising:

a user data memory area for storing user data;

a first memory area;

a second memory area;

a third memory area;

at least one control device including a processor, the control device configured for stipulating security information in the first memory area of the memory module and for automatically concomitantly updating at least one predefined portion of the security information upon a prescribed trigger, wherein the memory module automatically determines the portion of the stipulated security information to be automatically concomitantly updated, wherein a second memory area contains a cryptographic key, wherein the second memory area is writable for a single time, wherein an integrity value for all data or for a portion of the user data of the memory module is stored in the third memory area of the memory module, wherein the integrity value is produced, by the processor of the memory module, in an automated fashion upon storage of the user data on the memory module, wherein the integrity value is provided by the processor of the memory module.

21. The memory module as claimed in claim 20, further comprising a checking device for checking the automatically updated portion of the security information on a basis of a predefined check criterion; and a provision device for providing a signal if the result of the checking is a deviation from the predefined checking result.

22. The memory module as claimed in claim 20, further comprising: a random number generator and/or a real-time clock.

23. The memory module as claimed in claim 20, wherein the memory module is an EEPROM.

24. The memory module as claimed in claim 20, wherein the memory module is included as part of a computer system.

25. The memory module as claimed in claim 20, wherein the memory module is virtualized.

* * * * *